United States Patent Office 3,799,978
Patented Mar. 26, 1974

3,799,978
PROCESS FOR THE PREPARATION OF UNSATURATED CARBONYL COMPOUNDS
Takashi Ohara, Nishinomiya, Michikazu Ninomiya, Kobe, Isao Yanagisawa, Ikeda, Michio Ueshima, Nishinomiya, and Masahiro Takata, Toyonaka, Japan, assignors to Nippon Shokubai Kagaku Kogyo Co., Ltd., Osaka, Japan
No Drawing. Filed Dec. 23, 1971, Ser. No. 211,680
Int. Cl. C07c 57/04, 51/32
U.S. Cl. 260—533 N      2 Claims

ABSTRACT OF THE DISCLOSURE

A process for the preparation of unsaturated carbonyl compounds which comprises the catalytic vapor phase oxidation of an olefin having at least 3 carbon atoms in the presence of a catalytic oxide in which the atomic ratio among the constituent elements, Co:Fe:Bi:W:Mo:Si:Z ranges 2.0–20.0:0.1–10.0:0.1–10.0:0.5–10.0:2.0–11.5:0–15.0:0.005–1.0, with the proviso that W plus Mo equals 12.0, and Z stands for an alkaline earth metal.

---

This invention relates to a process for the preparation of unsaturated carbonyl compounds from olefins. More particularly, the invention relates to a process for the preparation of the corresponding unsaturated carbonyl compounds, for example, acrolein and acrylic acid, by the catalytic vapor phase oxidation of olefins having at least 3 carbon atoms.

In the industrial scale production of unsaturated carbonyl compounds by the catalytic vapor phase oxidation of the corresponding olefins, the use of catalyst which gives high conversion of olefins and shows high selectivity for the object unsaturated carbonyl compounds is particularly important.

As the catalyst conventionally employed in the preparation of acrolein or methacrolein by the catalytic vapor phase oxidation of propylene or isobutylene, respectively, a catalytic oxide composed of molybdenum, tellurium, cadmium, or zinc, and oxygen is recommended, for example, by the prior art disclosed in Japanese Official Patent Gazette, publication No. 10605/68. Also the same Gazette, publication No. 6245/69 teaches the use of a catalytic oxide composed of nickel, cobalt, iron, bismuth, molybdenum, phosphorus and oxygen. However, per-pass yields of the unsaturated carbonyl compounds obtained through the use of those known catalysts are far from satisfactory in commercial operation.

Accordingly, it is an object of the invention to provide a process for making unsaturated carbonyl compounds usable with industrial advantages using a novel catalyst system.

It has been discovered that the above object of the invention can be accomplished by using a catalytic oxide which comprises cobalt, iron, bismuth, tungsten, molybdenum, silicon, an alkaline earth metal and oxygen, since in the presence of such catalyst acrolein and acrylic acid can be obtained from propylene with very high per-pass yield.

The catalyst or catalyic oxide of the invention is characterized in that its constituent elements are present at such atomic ratios as:

Co:Fe:Bi:W:Mo:Si:Z=2.0–20.0:0.1–10.0:0.1–
10.0:0.5–10.0:2.0–11.5:0–15.0:0.005–1.0

(provided that W+Mo=12.0, and Z stands for an alkaline earth metal, i.e., Be, Mg, Ca, Sr, Ba or Ra). Presumably, the oxygen is present in the catalyst in the form of complex metal oxide or metallic acid salt. Consequently, the oxygen content of the catalyst varies depending on the atomic ratios of the metallic elements constituting the catalyst.

The catalyst of the invention can be prepared through the steps of, for example, mixing an aqueous solution of ammonium molybdate with that of ammonium p-tungstate, adding to the mixture aqueous solutions of respectively cobalt nitrate, iron nitrate, and bismuth nitrate, further adding thereto an aqueous solution of a hydroxide or carbonate of an alkaline earth metal and if desired, subsequently adding colloidal silica as a silicon source, concentrating the system by evaporation, molding the resulting clay-like substance and calcining the same at temperatures between 350–600° C., in an air current. Obviously, the starting materials of the catalyst are not limited to the ammonium salt, nitrate, hydroxide and carbonate as above, but other various compounds are equally useful as long as they can form the catalytic oxide upon calcination.

As the carrier, for example, silica gel, alumina, silicon carbide, diatomaceous earth, titanium oxide and "Celite," etc. may be employed, particularly preferred carriers being silica gel, titanium oxide and "Celite."

The catalytic vapor phase oxidation in accordance with the invention is performed by introducing a gaseous mixture composed of 1–10 vol. percent of an olefin such as propylene, 5–15 vol. percent of molecular oxygen, 20–60 vol. percent of steam and 20–50 vol. percent of an inert gas, onto the catalyst prepared as above, at temperatures ranging from 240–450° C. and pressures ranging from the normal atmospheric pressure to 10 atmospheres. Suitable contact time ranges from 1.0 to 10.0 seconds. The reaction can be carried out either with a fixed bed or fluidized bed. Through the above-specified operation, such results as 97–99.5 mol percent conversion of propylene, 82–37 mol percent selectivity for acrolein and 8–12 mol percent selectivity for acrylic acid can be obtained. These achievements are markedly superior to those of the prior art.

Although the present invention is not bound by any theory, the excellent results of the present process are presumably due to the appropriate adjustment of catalytic ability accomplished by the concurrent presence, in the catalytic oxide of the invention, of molybdate and tungstate of cobalt, iron, and bismuth, with oxides; and presence of heteropolyacid compounds containing silicon and the alkaline earth metal; etc. This presumption is substantiated by the fact that the selectivities are markedly improved by the presence of the alkaline earth metal, as demonstrated in the control which appears later.

The terms, conversion, selectively, and per-pass yield, are used in this specification with the definitions below.

$$\text{Conversion } (\%) = \frac{\text{Mol number of reacted olefin}}{\text{Mol number of supplied olefin}} \times 100$$

$$\text{Selectivity } (\%) = \frac{\text{Mol number of formed unsaturated carbonyl compound}}{\text{Mol number of reacted olefin}} \times 100$$

$$\text{Per-pass yield } (\%) = \frac{\text{Mol number of formed unsaturated carbonyl compound}}{\text{Mol number of supplied olefin}} \times 100$$

Hereinafter the invention will be more fully described with reference to working examples and a control, it being understood that the scope of this invention is by no means restricted thereby.

EXAMPLE 1

Seventy (70.0) g. of cobalt nitrate were dissolved in 20 ml. of distilled water. Also 24.3 g. of ferric nitrate were dissolved in 20 ml. of distilled water, and 29.2 g. of bismuth nitrate were dissolved in 30 ml. of distilled water which was made acidic with 6 ml. of conc. nitric acid. Separately, in 150 ml. of water, 106.2 g. of ammonium molybdate and 32.4 g. of ammonium p-tungstate were dissolved under heating and stirring. The foregoing three aqueous solutions of nitrates were dropped into the resultant aqueous solution of the ammonium salts, and further an aqueous solution formed by dissolving 0.21 g. of magnesium hydroxide in 15 ml. of distilled water and 24.4 g. of 20% silica-sol were added thereto. The suspension thus formed was heated under stirring to cause evaporation of the liquid component. The resulting solid was molded and calcined at 450° C. for 6 hours in an air current to form a catalyst. The metallic composition of the catalyst was as below, in terms of atomic ratio:

$$Co_4Fe_1Bi_1W_2Mo_{10}Si_{1.35}Mg_{0.06}$$

Sixty (60) ml. of the catalyst obtained were packed in a stainless steel U-shaped tube of 20 mm. in diameter. The tube was immersed in a molten nitrate bath heated at 320° C., and through the same tube a gaseous mixture composed of 4 vol. percent of propylene, 51 vol. percent of air and 45 vol. percent of steam was passed and reacted with a contact time of 2.7 seconds. The results were as shown in the subsequent table.

EXAMPLE 2

Example 1 was repeated except that the reaction temperature and the contact time were changed to 330° C. and 1.8 seconds, respectively. The results were as shown below.

| | Percent |
|---|---|
| Propylene conversion | 98.1 |
| Selectivity to acrolein | 88.0 |
| Selectivity to acrylic acid | 8.2 | under the same conditions as in Example 1. The results were as shown in the subsequent table.

EXAMPLE 6

A catalyst of the composition in terms of atomic ratio:

$$Co_4Fe_1Bi_1W_2Mo_{10}Si_{1.35}Sr_{0.06}$$

was prepared in a manner similar to Example 1 except that 0.762 g. of strontium nitrate was used instead of 0.21 g. of magnesium hydroxide.

The catalyst was used in the reaction of Example 1, with the results as shown in the subsequent table.

EXAMPLE 7

A catalyst of the composition in the terms of atomic ratio:

$$Co_4Fe_1Bi_1W_2Mo_{10}Si_{1.35}Ba_{0.06}$$

was prepared in a manner similar to Example 1 except that 0.941 g. of barium nitrate was used instead of 0.21 g. of magnesium hydroxide.

This catalyst was used in the reaction of Example 1, with the results as shown in the subsequent table.

CONTROL

Example 1 was repeated except that the use of magnesium hydroxide was omitted. The composition of the resulting catalyst was as follows, in terms of atomic ratio:

$$Co_4Fe_1Bi_1W_2Mo_{10}Si_{1.35}$$

This catalyst was used in the reaction of Example 1, with the results as given in the following table.

TABLE

| | Composition of catalyst (atomic ratio) | | | | | | | | | Reaction temperature (° C.) | Propylene conversion (mol percent) | Selectivity (mol percent) | | Per-pass yield (mol percent) | |
|---|---|---|---|---|---|---|---|---|---|---|---|---|---|---|---|
| | Co | Fe | Bi | W | Mo | Si | Ca | Mg | Sr | Ba | | | Acrolein | Acrylic acid | Acrolein | Acrylic acid |
| Example: | | | | | | | | | | | | | | | | |
| Number 1 | 4 | 1 | 1 | 2 | 10 | 1.35 | | 0.06 | | | 320 | 98.0 | 87.2 | 9.0 | 85.5 | 8.8 |
| Number 4 | 4 | 1 | 1 | 2 | 10 | 1.35 | 0.06 | | | | 320 | 99.5 | 82.0 | 12.1 | 81.6 | 12.0 |
| Number 5 | 4 | 1 | 1 | 3 | 9 | 1.5 | 0.08 | | | | 315 | 97.0 | 83.1 | 12.3 | 80.6 | 11.9 |
| Number 6 | 4 | 1 | 1 | 2 | 10 | 1.35 | | | 0.06 | | 315 | 98.5 | 81.0 | 11.4 | 79.8 | 11.2 |
| Number 7 | 4 | 1 | 1 | 2 | 10 | 1.35 | | | | 0.06 | 315 | 99.0 | 81.5 | 10.8 | 80.8 | 10.6 |
| Control | 4 | 1 | 1 | 2 | 10 | 1.35 | | | | | 320 | 94.5 | 71.5 | 11.4 | 67.5 | 10.7 |

EXAMPLE 3

The reaction was carried out under the same conditions as in Example 1 except that the starting gaseous mixture was composed of 7 vol. percent of propylene, 63 vol. percent of air and 30 vol. percent of steam and the reaction temperature was raised to 325° C. The following results were obtained.

| | Percent |
|---|---|
| Propylene conversion | 97.8 |
| Selectivity to acrolein | 86.0 |
| Selectivity to acrylic acid | 9.8 |

EXAMPLE 4

A catalyst of the composition in terms of atomic ratio:

$$Co_4Fe_1Bi_1W_2Mo_{10}Si_{1.35}Ca_{0.06}$$

was prepared in the manner similar to catalyst preparation in Example 1 except that 0.266 g. of calcium hydroxide was used instead of 0.21 g. of magnesium hydroxide.

The catalyst was used in the reaction of Example 1, with the results as shown in the subsequent table.

EXAMPLE 5

A catalyst of the composition in terms of atomic ratio:

$$Co_4Fe_1Bi_1W_3Mo_9Si_{1.5}Ca_{0.08}$$

was prepared in accordance with the procedure of Example 1. Using this catalyst, the reaction was carried out

We claim:

1. A process for the preparation of acrolein and acrylic acid which comprises catalytically oxidizing propylene in the vapor phase in the presence of a catalytic oxide consisting essentially of Co:Fe:Bi:W:Mo:Si:Z having the atomic ratios 2.0–20.0:0.1–10.0:0.1–10.0:0.5–10.0:2.0–11.5:0–15.0:0.005–1.0 and oxygen, with the proviso that W plus Mo equals 12.0, and Z represents an alkaline earth metal, at a temperature ranging from 250 to 450° C. and a pressure ranging from atmospheric pressure to 10 atmospheres.

2. A process for the preparation of unsaturated carbonyl compounds which comprises catalytically oxidizing propylene or isobutylene in the vapor phase in the presence of a catalytic oxide consisting essentially of Co:Fe:Bi:W:Mo:Si:Z having the atomic ratios 2.0–20.0.0:0.1–10.0:0.1–10.0:0,5–10.0:2.0–11.5:0–15.0:0.005–1.0, and oxygen with the proviso that W plus Mo equals 12.0, and Z represents an alkaline earth metal at a temperature ranging from 150 to 450° C., and a pressure ranging from atmospheric pressure to 10 atmospheres.

References Cited

UNITED STATES PATENTS 3,435,069  3/1969  Bethell et al. _____ 260—533 N
3,642,930  2/1972  Grasselli et al. ____ 260—533 N LORRAINE A. WEINBERGER, Primary Examiner R. D. KELLY, Assistant Examiner U.S. Cl. X.R.

252—456, 468; 260—604 R

UNITED STATES PATENT OFFICE
CERTIFICATE OF CORRECTION

Patent No. 3,799,978         Dated   March 26, 1974

Inventor(s)  Takashi OHARA ET AL

It is certified that error appears in the above-identified patent and that said Letters Patent are hereby corrected as shown below:

IN THE HEADING:

Insert applicants' claim for priority as follows:

--Claims priority, application Japan, No. 118789/45, filed December 26, 1970--

Signed and sealed this 17th day of September 1974.

(SEAL)
Attest:

McCOY M. GIBSON JR.
Attesting Officer

C. MARSHALL DANN
Commissioner of Patents